United States Patent [19]

Honsa

[11] Patent Number: 4,768,943
[45] Date of Patent: Sep. 6, 1988

[54] APPARATUS FOR USE IN FORMING HOLLOW PLASTIC DRUMSTICKS

[75] Inventor: Horst L. A. Honsa, Savannah, Tenn.

[73] Assignee: Lancaster Tool & Tie Co., Inc., Jacks Creek, Tenn.

[21] Appl. No.: 38,281

[22] Filed: Apr. 14, 1987

[51] Int. Cl.$^4$ .............................................. A01J 21/00
[52] U.S. Cl. ...................... 425/236; 425/556; 425/577; 425/589; 425/468; 425/412; 425/414
[58] Field of Search ............... 425/236, 554, 552, 550, 425/589, 351, 468, 577, 412, 414, 436 R; 249/122, 160, 161; 264/334

[56] References Cited

U.S. PATENT DOCUMENTS

| | | | |
|---|---|---|---|
| 1,182,177 | 5/1916 | Kasch | 425/414 |
| 2,439,782 | 4/1948 | Schmid et al. | 425/351 |
| 4,435,147 | 3/1984 | Myers | 425/577 |

*Primary Examiner*—Bernard Nozick
*Attorney, Agent, or Firm*—Vaden, Eickenroht, Thompson & Boulware

[57] ABSTRACT

There is disclosed apparatus for use in forming hollow plastic drumsticks wherein plastic is injected into annular spaces formed between core pins and outer mold surfaces formed by cavities on the inner faces of mold members when engaged with one another. Upon hardening of the hollow plastic bodies within the annular spaces, the mold members are moved apart to a position in which the core pins about which plastic bodies are formed are moved laterally to positions in which a means surrounding each of the pins may be moved longitudinally along them in order to eject the molded bodies therefrom. In preparation for a subsequent molding process, the ejecting means is returned to its original position, the mold members are returned to their original position in which the core pins are disposed within the outer mold surfaces.

15 Claims, 9 Drawing Sheets

APPARATUS FOR USE IN FORMING HOLLOW PLASTIC DRUMSTICKS

This invention relates to improved apparatus for use in forming hollow plastic drumsticks.

Drumsticks of this type have become increasingly popular since they are lighter than wood, yet retain approximately the same sound characteristics. However, to our knowledge, they have been formed by injection molding a solid rod having the outer configuration of the drumstick, and then boring a hole in the rod. As will be appreciated, it is not only difficult but also time consuming and labor intensive to bore such a hole through a long, thin rod.

Presumably, however, it has not been thought possible to instead injection mold the drumstick in its hollow shape, probably because of its long, slender shape, and thus the difficulty which would be encountered, in conventional injection molding procedures, in maintaining an inner mold member or core pin concentrically within the cavity of an outer mold member during the molding process, and thus forming a molded body of uniform thickness. Further difficulty would be anticipated in removing this core pin from within the molded plastic body and then repositioning it for a subsequent molding cycle, as is the conventional practice, at least without damage to the core pin. This is not surprising since it is generally accepted practice in the injection molding industry to form core holes no more than two or three inches deep.

The primary object of this invention is to provide apparatus for use in forming hollow plastic drumsticks by an injection core molding process in which the core pin is maintained concentrically within the mold cavity and in which the risk of damage to the core pin between molding cycles is minimal.

Another object is to provide such apparatus in which a plurality of drumsticks of the same or different sizes may be simultaneously formed.

A further object is to provide such apparatus which is of relatively inexpensive construction, adaptable to use with conventional injection molding equipment and procedures, and which is quick and easy to operate.

These and other objects are accomplished, in accordance with the illustrated embodiment of the invention, by apparatus of the type described wherein the core pin is supported concentrically within the cavities in opposite faces of mold members to form an annular space between the pin and an outer mold surface conforming to the outside of a drumstick, and plastic is injected through an annular restriction formed on the mold members at one end of the annular space and into the annular space to cause the plastic to flow therethrough in a direction toward the other end of the annular space, thus insuring uniform flow of the plastic along the length of the core pin which minimizes the tendency of the core pin to be shifted to one side or the other of its concentric position. More particularly, following injection of the plastic material into the annular space, and chilling of the plastic to cause it to harden into a molded plastic body including a drumstick of the desired shape, the inner faces of the mold members are moved away from one another to permit the hollow molded body to be ejected or moved off of the core pin by means which surrounds the core pin for movement longitudinally therealong while the pin is held in a stationary longitudinal position. Then, upon removal of the molded body, the ejecting means may be moved in the opposite longitudinal direction to return it to its original position, and the mold members may be returned to positions in which their inner faces are engaged with one another to reform the annular space about the pin in preparation for a subsequent molding cycle. Thus, the core pin need not be moved longitudinally out of and back into a position in which it is supported concentrically within the outer mold surface.

In the illustrated and preferred embodiment of the invention, a means is provided for holding one end of the core pin against longitudinal movement with respect to the mold members, the inner faces of the mold members have means for closely receiving the other end of the core pin, and the means for ejecting the molded plastic body is longitudinally movable in a direction away from the holding means to eject the molded body from the other end of the core pin. More particularly, the means for holding one end of the pin is movable laterally with respect to the mold members between a first position in which the pin is supported concentrically within the outer mold surfaces, and a second position in which the ejecting means may be moved longitudinally between the inner faces of the mold members when the mold members are in their outer positions. As illustrated, the means for holding one end of the pin is disposed between the mold member faces and supported for guided movement laterally with respect thereto, and the ejecting means is supported from the pin holding means for guided movement longitudinally with respect to it.

As illustrated, the means for moving the ejecting means includes a cylinder mounted on the pin holding means, and a piston reciprocable within the cylinder and connected to the ejecting means. Thus, the ejecting means is supported from the pin holding means by elongate pins which are guidably slidable within the pin holding means and which have their opposite ends connected to the ejecting means and guidably slidable along the cylinder.

The mold members have a plurality of cavities in their interfaces to form a corresponding number of outer mold surfaces when engaged with one another, and there are a corresponding number of core pins each supported in a longitudinally stationary position concentrically within an outer mold surface. More particularly, plastic may be injected into each annular space, and each of said core pins is surrounded by means for longitudinal movement along the core pin so as to substantially simultaneously remove each of the plurality of molded plastic bodies from the core pins.

Thus, as illustrated, each mold member include a plurality of parallel elongate blocks, and the block of each mold member has a cavity formed therein adapted to form an outer mold surface with a the cavity of a block of the other molded member. Each block includes an elongate body in which the cavity is formed and a separate gate carried at one end of each body. More particularly, the means for restricting flow in each annular space is formed by inner annular surfaces on the sides of the gates adjacent the elongate body, and the gates have cavities therein which form extensions of the outer mold surfaces on the opposite sides of the restrictions into which plastic may be injected. The separate gates may be removed for replacement or repair in the event of wear of their annular surfaces.

The means for ejecting each molded plastic body includes a sleeve surrounding the core pin on which the body is formed and closing the outer end of the extension of the outer mold surface, and each mold member includes means supporting the gates and having recesses therein to closely surround the sleeves. As shown, the supporting means and gates have inner connecting plastic passageways leading to the extensions of the outer mold surfaces, and thus leading to the restriction through which the plastic is caused to flow into the annular surfaces about the core pins, supported concentrically within the mold surfaces. More particularly, the gates of the blocks of each mold member have passageways which connect with one another so that the plastic may be injected simultaneously into all of the annular spaces through a common passageway leading to the passageways in the supporting means.

As will be appreciated, the separate and individual mold members enable the molding of drum sticks of a wide variety of shapes and sizes, which might not be possible if the outer mold surfaces were formed in one block of an integral mold member. At the same time, this interchangeability of blocks does not require modification or alteration of the plastic injecting passageways in the supporting means.

In the drawings, wherein like reference characters are used throughout to designate like parts:

Figure 1:
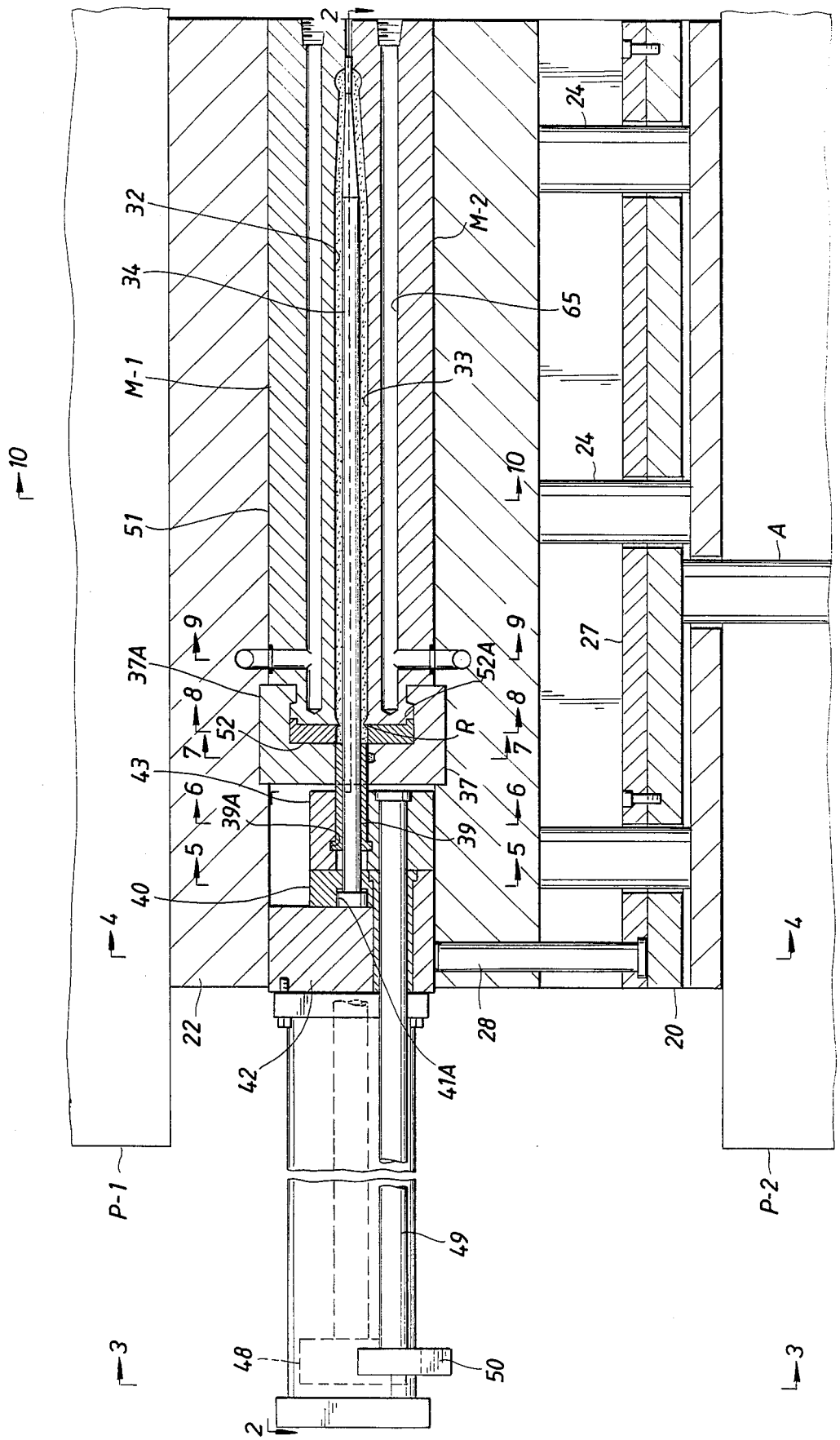
FIG. 1 is a longitudinal sectional view of the apparatus of the present invention, as seen along broken lines 1—1 of FIG. 2, and showing the injection of plastic into the annular space between the cavities forming outer mold surfaces of one pair of mold member blocks and a core pin supported concentrically thereof.
Figure 2:
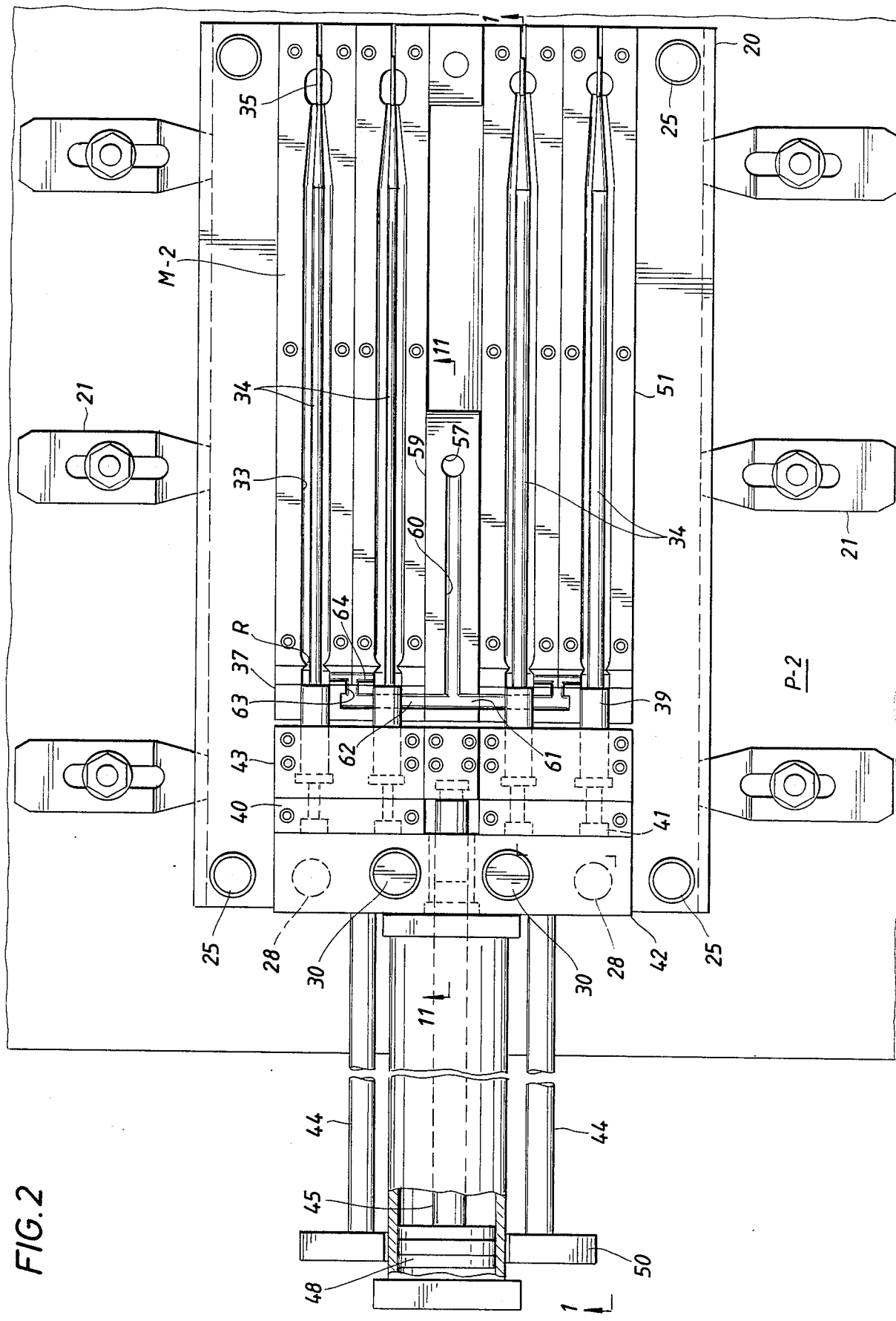
FIG. 2 is a longitudinal sectional view of the apparatus, as seen along broken lines 2—2 of FIG. 1, and showing the injection of plastic simultaneously into the annular spaces formed between four pairs of mold member blocks and core pins supported concentrically thereof.
Figure 3:
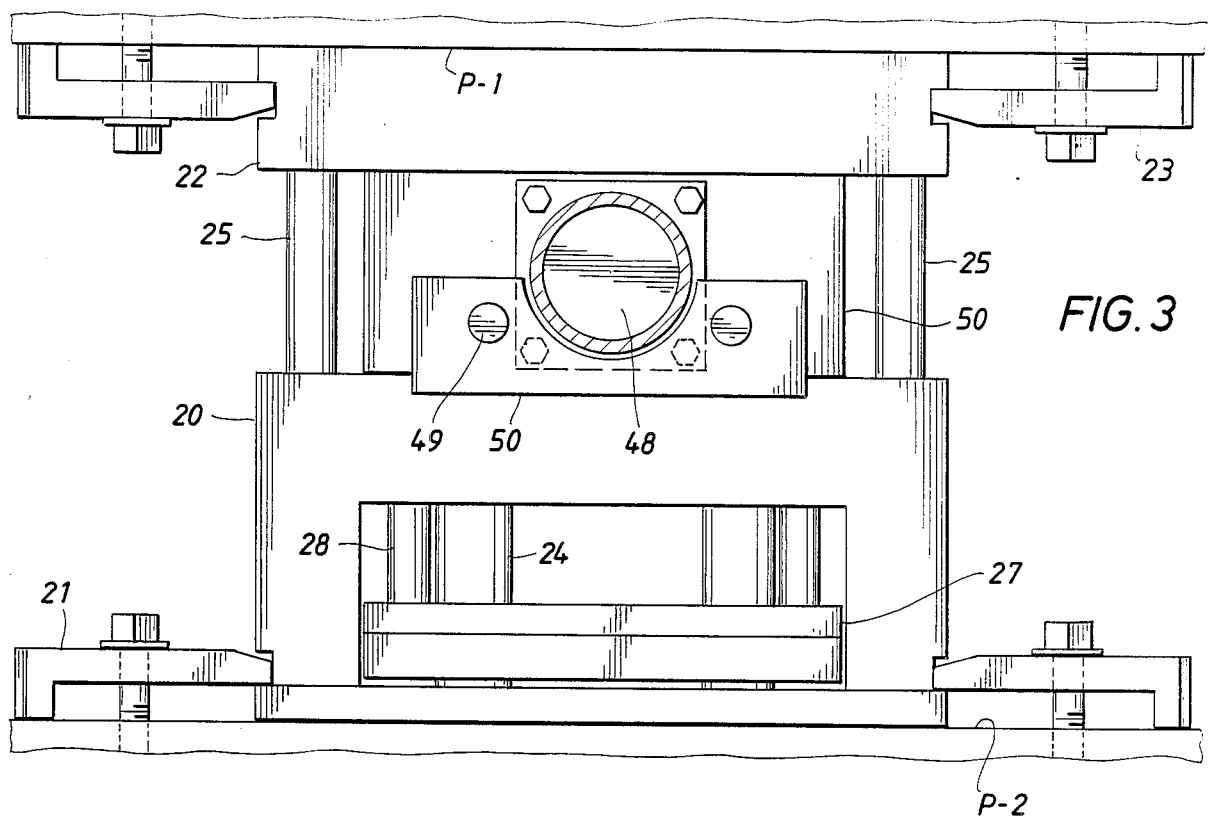
FIG. 3 is an end view of the apparatus, as seen along broken lines 3—3 of FIG. 1.
Figure 10:
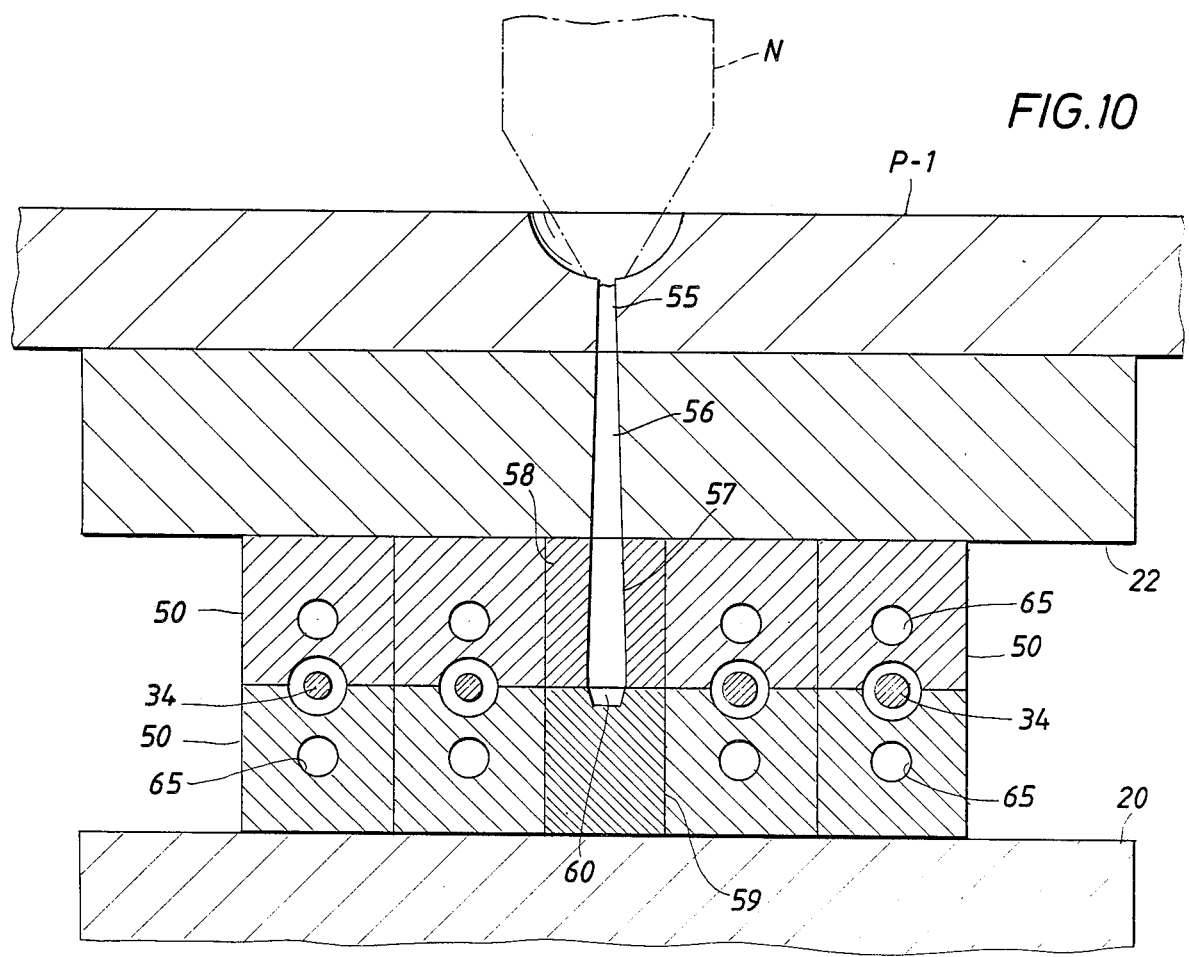
Figure 11:
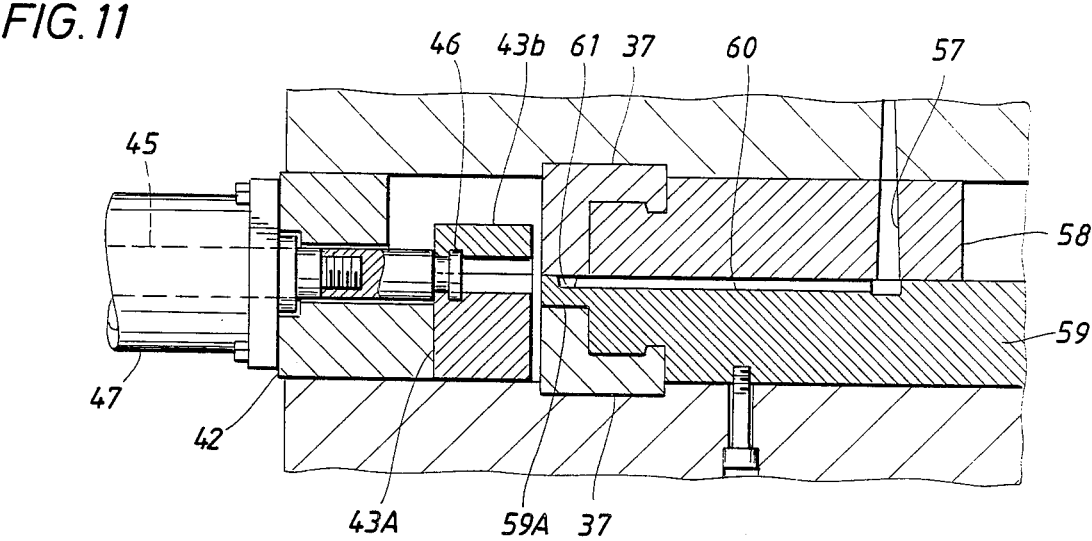
Figure 14:
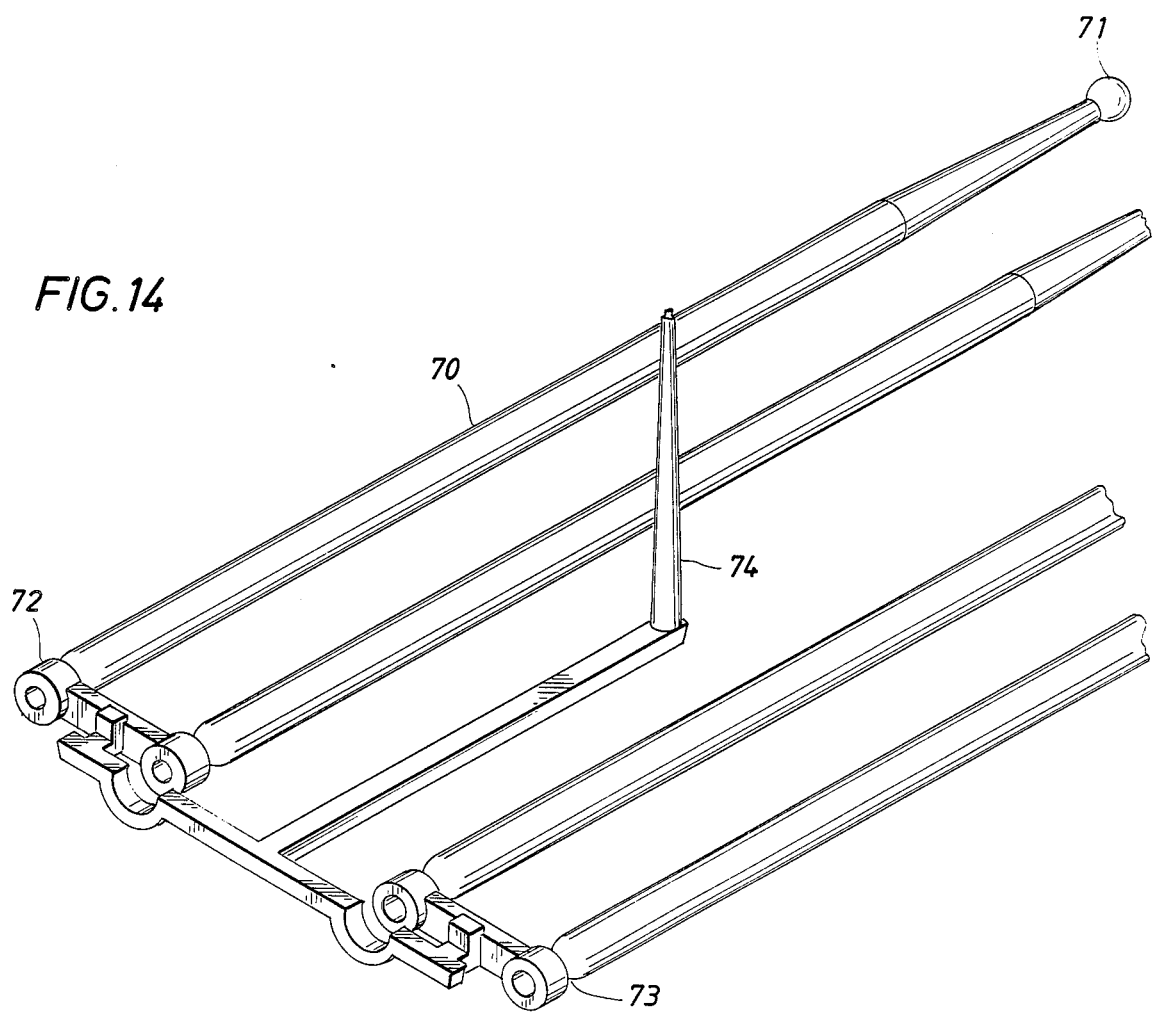
Figure 12:
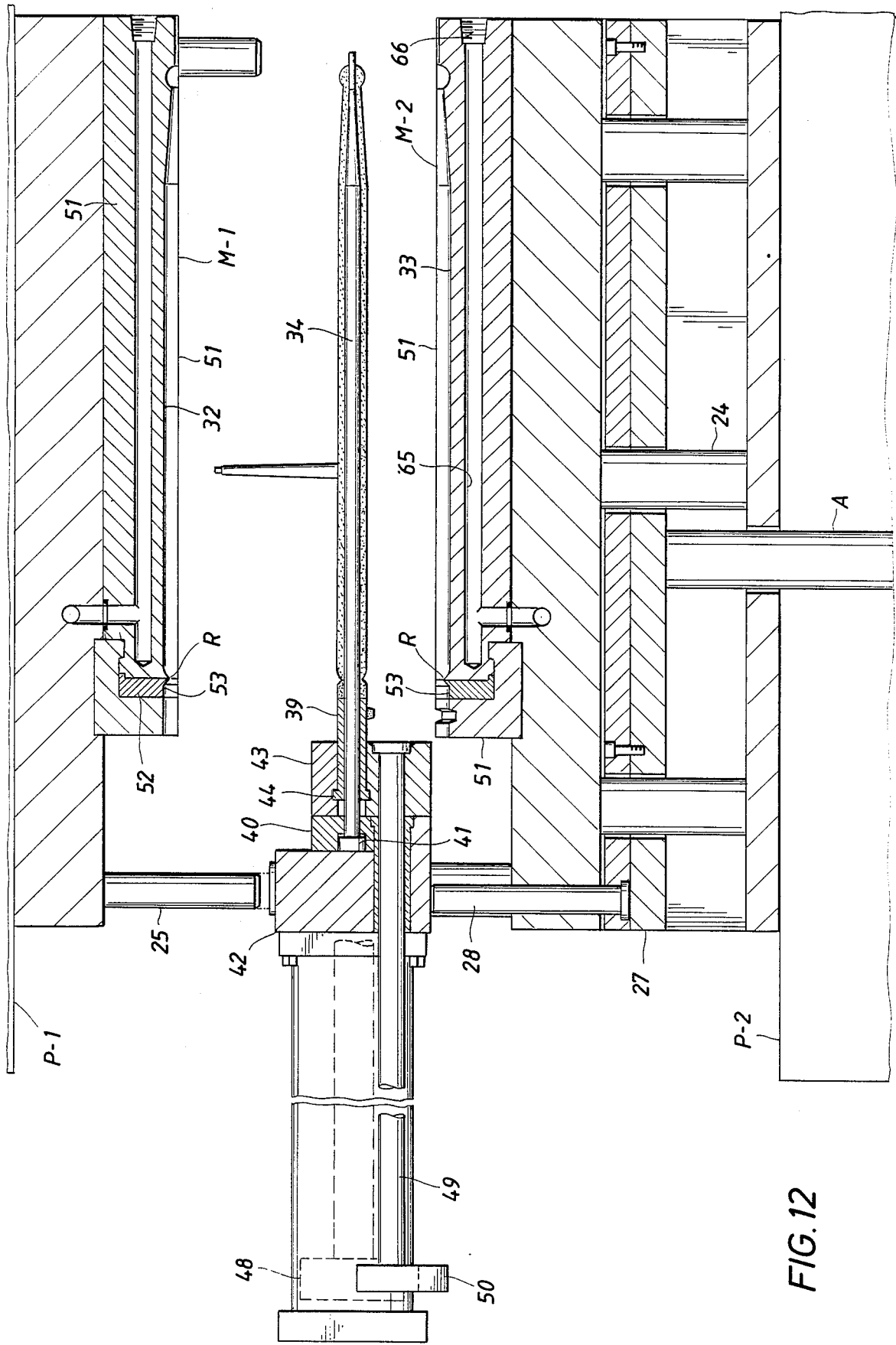
Figure 13:
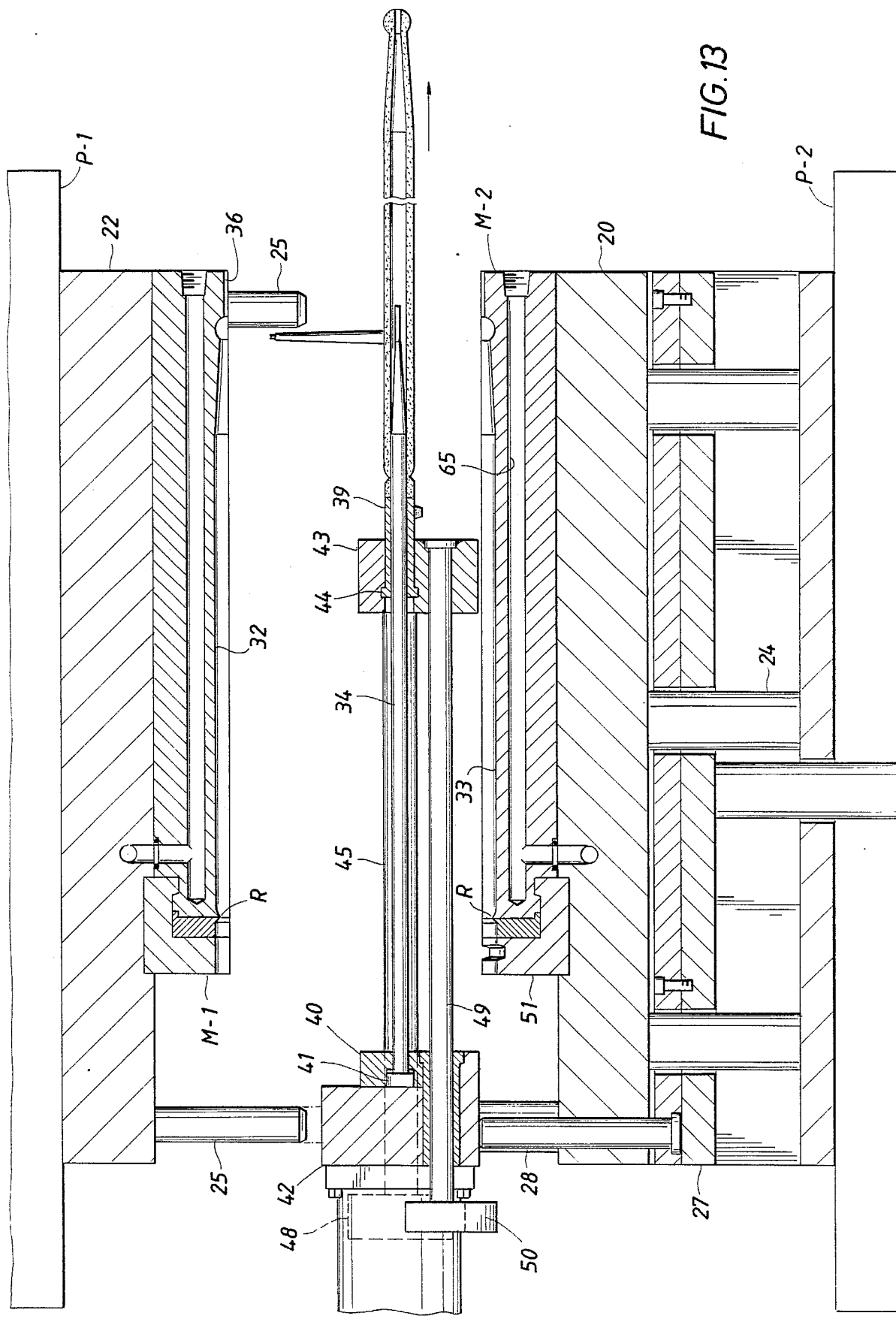

FIGS. 4, 5, 6, 7, 8, 9, and 10 are cross-sectional views of the apparatus as seen along broken lines 4—4, 5—5, 6—6, 7—7, 8—8, 9—9, and 10—10 of FIG. 1;

FIG. 11 is a partial longitudinal sectional view of the apparatus, as seen along broken lines 11—11 of FIG. 2 and showing the injection of plastic from an injection port in one of the platens, as shown in FIG. 10, into a common passageway formed in one of the mold members for connection with passageways in the supporting means;

FIG. 12 is a longitudinal sectional view, similar to FIG. 1, but upon movement of the inner faces of the mold members away from one another following hardening of the molded plastic body about the pins;

FIG. 13 is a longitudinal sectional view, similar to FIG. 12, but upon extension of the piston rod in the cylinder to move the sleeves longitudinally along the core pins in order to eject the molded plastic bodies therefrom; and FIG. 14 is an enlarged perspective view of an assembly of the molded plastic bodies upon removal of the mold pins, including drumsticks which may be individually broken off from the portions of the bodies formed in the extensions of the annular spaces and passageways leading thereto.

The overall molding equipment includes a pair of platens P-1 and P-2, which may be of conventional construction, platen P-2 being stationary and platen P-1 being movable toward and away from platen P-2. Thus, platen P-1 may be moved between a first position in which the molding apparatus to be described is positioned for the injection of plastic into the annular spaces for forming the drum sticks, as shown in FIG. 1, and a second position further from the platen P-2 to permit removal of the molded plastic bodies from the core pins, as shown in FIGS. 12 and 13. An ejector housing 20 is releasably connected to platen P-2 by means of clamps 21, and a clamping plate 22 is releasably connected to platen P-1 by means of clamps 23. The ejector housing is of inverted U-shape, and is supported along its span by means of columns 24, and rods 25 extend from the face of the platen P-1 for movement into guide sockets 26 in the face of the ejector housing as the platen P-1 is moved toward and away from the platen P-2 to move the molding apparatus into and out of a position for a molding cycle.

A plate 27 is mounted for reciprocation within the housing 20 and has pins 28 which extend therefrom and through the span of the housing. When the plate is in a lower position with respect to the housing, as shown in FIG. 1, for example, the upper ends of the pins are substantially flush with the face of the housing. When the plate is raised, however, to the position shown in FIG. 13, for example, as by means of an actuator A, the ends of the pins are moved outwardly from the face of the housing. As will be described to follow, this is useful in the raising of the molded plastic bodies to a position in which they may be removed from the core pins.

Additional pins 30 are mounted on the span of the housing and extend from the face thereof for movement into sockets or openings 31 formed in the face of the clamping plate 22 when the platen P-1 is moved toward the platen P-2. In addition to guiding the platens with respect to one another as they move to their relative inner positions, these pins maintain the core pins in fixed longitudinal positions during the molding operation, as will also be described to follow.

The molding apparatus constructed in accordance with the present invention comprises, as shown in the drawings, a pair of mold members M-1 and M-2, the mold member M-1 being connected to the face of the clamping plate 22 for movement with the platen P-1, and the mold member M-2 being connected to the housing 20 and thus held stationary with the platen P-2. As shown in FIG. 1, for example, upon movement of the platen P-1 toward the platen P-2, the inner face of the mold member M-1 is brought into engagement with the inner face of the mold member M-2, and upon movement of the platen P-1 away from the platen P-2, as shown in FIG. 12, the inner faces of the mold members are moved apart so as to permit removal of the molded plastic bodies from the core pins as will be described.

Mold member M-1 has plurality of elongate cavities 32 formed in the inner face thereof opposite matching cavities 33 formed in the inner face of the mold member M-2. When the inner faces of the mold members are brought into engagement, these cavities form elongate outer mold surfaces which define the outer surface of the bodies to be molded therein. Each of a plurality of core pins 34 are supported in longitudinally stationary positions between the mold members for extension concentrically within each outer mold surface to form annular spaces between each pin and outer mold surface into which plastic may be injected to form the molded bodies to be described.

Thus, as will be described, one end of each core pin is held against movement longitudinally but caused to move laterally with respect to the mold members, when they are moved to their outer positions, as shown in FIG. 12, while the outer reduced end 35 of each core pin is closely received within recesses 36 formed in the ends of the cavities 32 to not only hold such one end of the core pin in its concentric position but also close one end of the annular space when the mold members are in their inner positions, as shown in FIG. 1. As previously described, the mold members include means which forms an annular restriction R at the end of each annular space adjacent the end of the core pin which is held, and plastic is adapted to be injected through the restriction and into the annular space for flow therethrough toward the other end of the space, and thus in a direction from left to right, as shown in the drawings.

Figure 4:
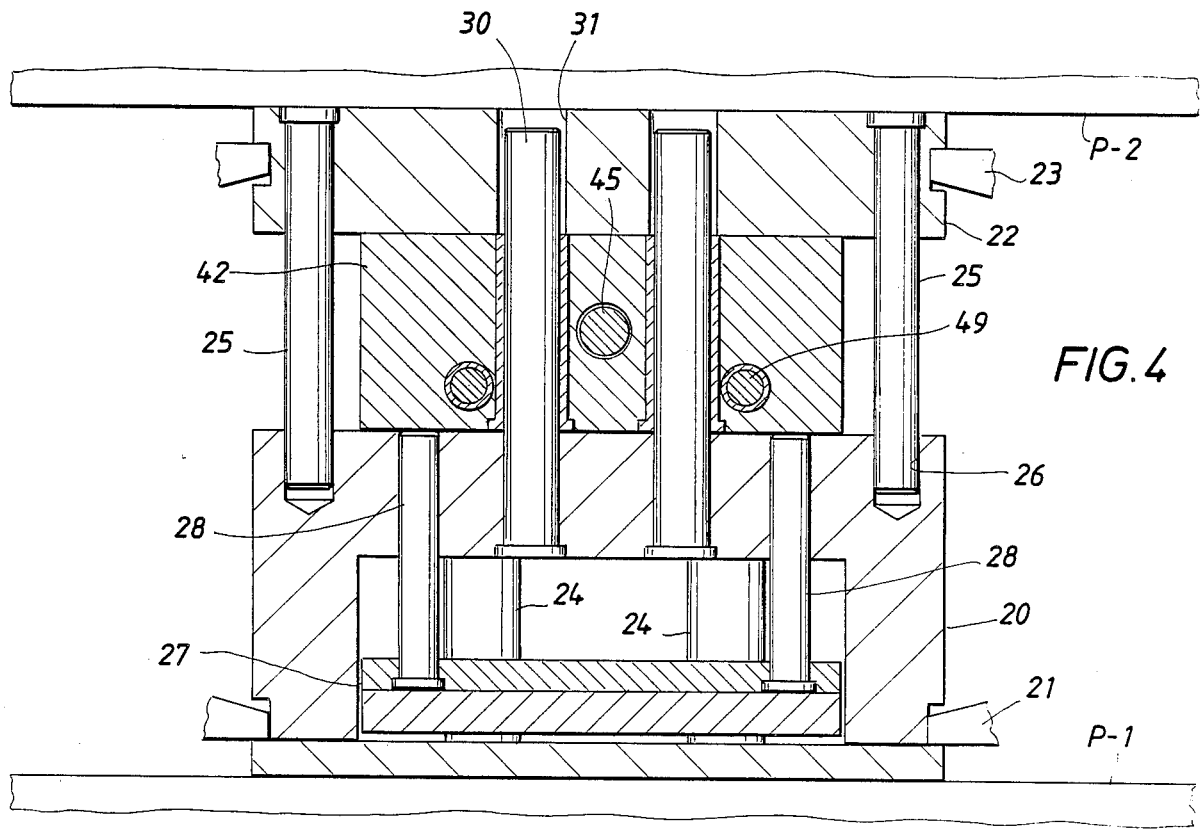
Figure 5:
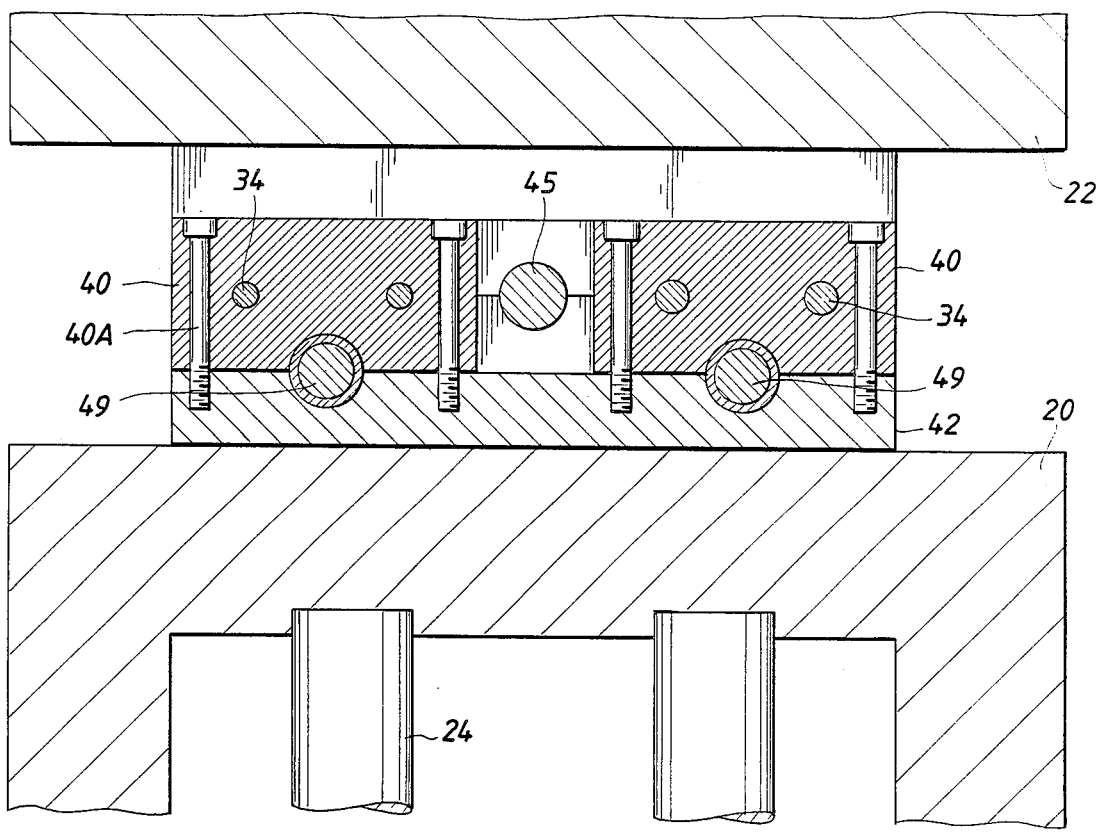

The left-hand ends of the core pins 34 have enlarged heads 41 which are received in recesses 41A (FIG. 1) in bodies 40 and thus held against longitudinal movement with respect thereto. More particularly, a pair of pins are held by and extend closely through holes in each of a pair of the bodies, which are in turn connected by bolts 40A (FIG. 5) in supported position on a flange on one side of a body 42. Thus, the bodies 40 are disposed between the faces of the clamping plate and housing to the left of the mold members secured thereto, and are held in a fixed longitudinal position with respect thereto by means of the pins 30 which extend from the housing and through guide holes in body 42, as shown in FIG. 4. The pins 28 mounted on the plate 27 are positioned to engage the body 42 in order to move it between a position generally in longitudinal alignment with the mold members, when the plate 27 is lowered, as shown in FIG. 1, and another position, upon raising of the plate 27 to the position shown in FIG. 12, in which the body 42 and thus the body 40 and the core pins supported thereon are laterally intermediate the inner faces of the molded members following a molding operation. During this movement, the pins 30 remain within the holes in the body to hold it against longitudinal movement.

Each core pin is closely surrounded by a sleeve 39 which is supported from a body 43 and has an enlarged head 44 on its left-hand end received in a recess 39A in the body 43 to hold the sleeve against longitudinal movement with respect thereto. As shown, the right-hand end of the sleeve extends from the right-hand side of the body 43 for disposal within recesses in the adjacent ends of mold members when their inner faces are engaged during a molding operation, as will be described in detail to follow. However, following a molding operation, and upon movement of the platen P-1 away from the platen P-2 to move the mold member M-1 away from the mold member M-2, and movement of the plate 27 away from the platen P-2 to extend the pins 28 from the housing and thus move the core pins to positions laterally intermediate the inner faces of the mold members, as shown in FIGS. 12 and 13, the body 43 and thus the ejector sleeves 39 supported thereon are free to move away from the bodies 40 and 42 and longitudinally along the pins intermediate the faces of the mold member to eject the molded bodies from the core pins, as shown in FIG. 13.

Figure 6:
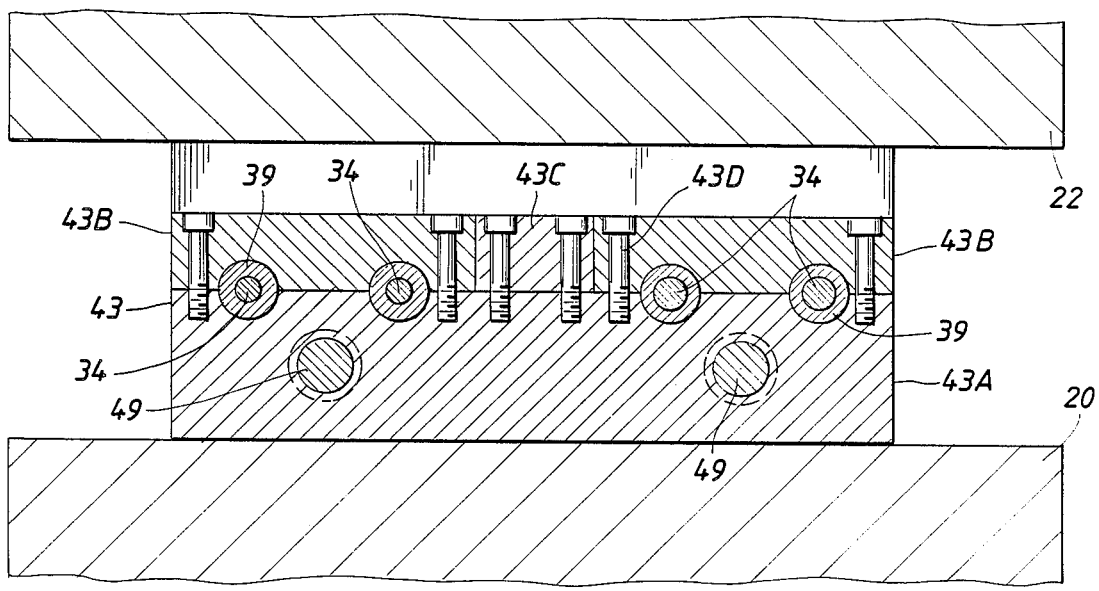

As shown in FIG. 6, the body 43 includes a lower part 43A which is supported from the body 42, as will be described, and a pair of laterally spaced upper parts 43B connected by bolts 43C to lower part 43A. The upper parts 43B and lower part 43A have matching recesses formed therein for closely receiving the ejector sleeves 39 which surround the core pins 34, and the body 43, and thus the ejector sleeves 39, are adapted to be moved longitudinally with respect to the body 42 and thus the core pins in order to move the body 43 and thus the ejector sleeves 39 between the positions of FIG. 12 and FIG. 13. For this purpose, piston rod 45 of a piston 48 reciprocable within a cylinder 47 bolted or otherwise secured to the left-hand end of the body 42 extends from the end of the cylinder and through the body 42 (FIG. 11) and between bodies 40 (FIG. 5) for connection to the body 43. As shown in FIG. 11, this connection includes an enlarged head 46 on the end of the rod received closely within recesses formed in the adjacent surfaces of body part 43A and body part 43C (FIG. 5) bolted thereto in a position intermediate the body parts 43B (FIG. 6).

Guide rods 49 are connected to and extend from the body part 43A and through holes formed by recesses in the adjacent faces of bodies 40 and 42 (FIG. 5) and in the body 42 for connection at their left-hand ends to a bracket 50 guidably slidable along the cylinder 49. These rods thus provide a means supporting the body 43 and thus the sleeves 39 other than the support they receive from the core pins, thereby minimizing any tendency to bend or distort the core pins during ejection of the molded bodies therefrom.

Each of the mold members M-1 and M-2 comprises elongate blocks including elongate bodies 51 releasably connected to the face of either the clamping plate or the housing by bolts 51A. As shown, the bodies are arranged in side-by-side, parallel pairs with the bodies of each pair being opposite those of another pair. More particularly, cavity 32 is formed in the body of each such block of mold member M-1 for disposal opposite the cavity 33 in the body of a block opposite thereto in order to form individual outer mold surfaces when the inner faces of the mold members are brought into engagement. Each mold member block also includes a gate 52 at the end of each body of a block, with each gate having inner arcuate surface 53 (FIG. 8) adapted to form with the inner surface of the opposite gate of the other mold member a continuation of the cavity formed in the bodies of the mold members and thus a continuation of the annular spaces between them, when their inner faces are brought into engagement.

Figure 7:
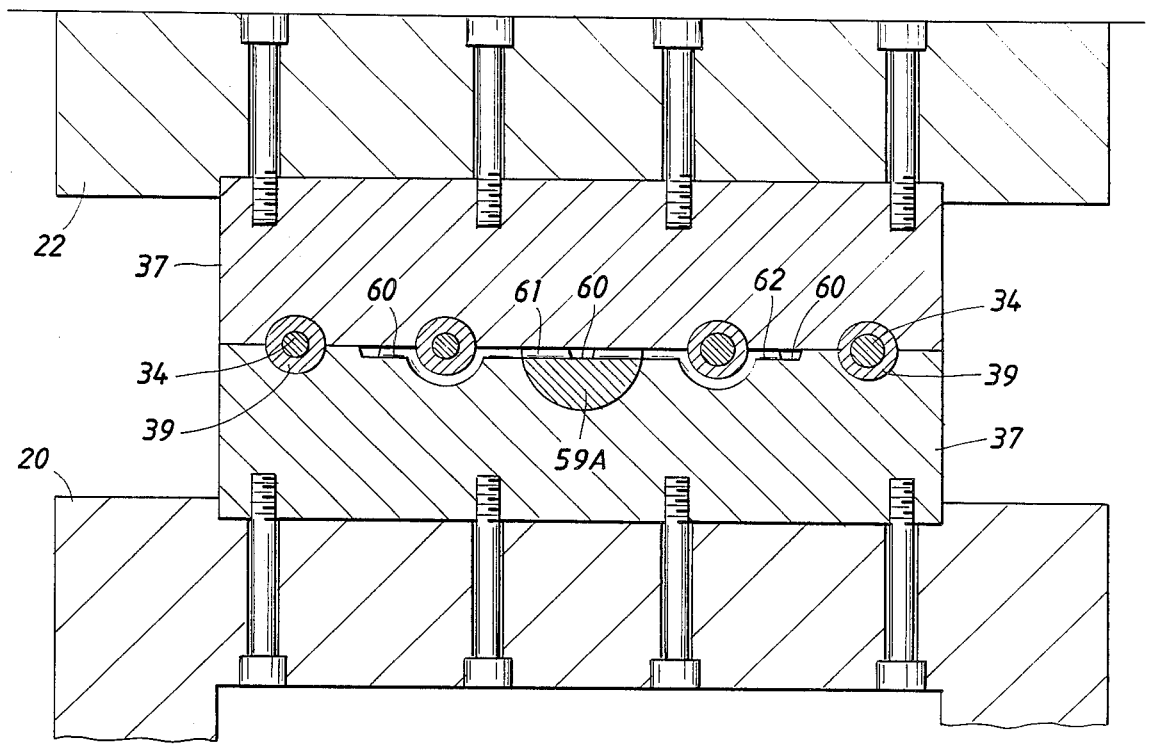

As shown in FIG. 2, each mold member also includes a support 37 which extends laterally of the ejector housing to which the elongate bodies 51 are bolted, and which is in turn supported from the left ends of the bodies 51 by means of a flange 37A extending over the left hand ends. As also shown therein, each of the gates is supported from the end of an adjacent body 51 by means of a flange 52A, which is held in supported position by the support 37, whereby, as shown in FIG. 7, matching grooves on the support fit closely about the ends of the ejection sleeves 39 which project from the body 43 when the mold member faces are engaged. As shown in FIGS. 1 and 2, the end faces of the sleeves close the ends of the annular spaces formed by the gates.

The left-hand ends of the inner surfaces 53 of the cavities formed in the elongate bodies 51 and the right-hand ends of the cavities formed by the inner surfaces of adjacent gates are turned radially inwardly to form the previously mentioned restriction R through which plastic must flow from left to right into the annular spaces about the core pins. Inasmuch as they are separate from the bodies of the block members, each of the gates 52 may be individually replaced or repaired because of wear of their radially inwardly extending surfaces during molding operations. As previously described, of course, the construction of the mold members of separate blocks permits drum sticks of different shapes to be simultaneously molded in the apparatus of this invention.

Plastic is adapted to be injected into the annular spaces through a port 55 formed in the platen P-1 and connecting with a port 56 through the clamping plate 22. As will be apparent from FIG. 10, the plastic may be injected through a nozzle N, and following removal of the nozzle, the molted plastic, upon hardening, will break off at a point near the upper end of the port 55.

As shown in FIG. 10, the inner end of the port 56 connects with a port 57 formed within an elongate body 58 connected to the clamping plate 22 laterally intermediate the innermost elongate mold member bodies 51 of mold member M-1. The lower end of port 57 connects with a passageway 60 formed in the face of another elongate body 59 connected to the ejector housing 20 intermediate the inner bodies 51 of the other mold member and engaged with the face of body 58 when the mold member faces are engaged.

Figure 8:
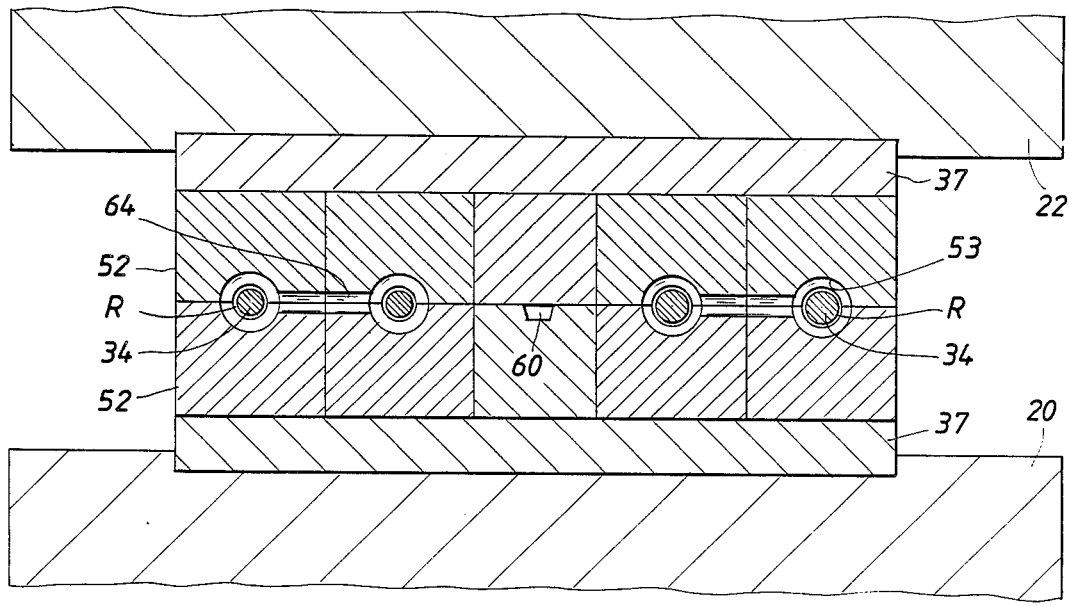
Figure 9:
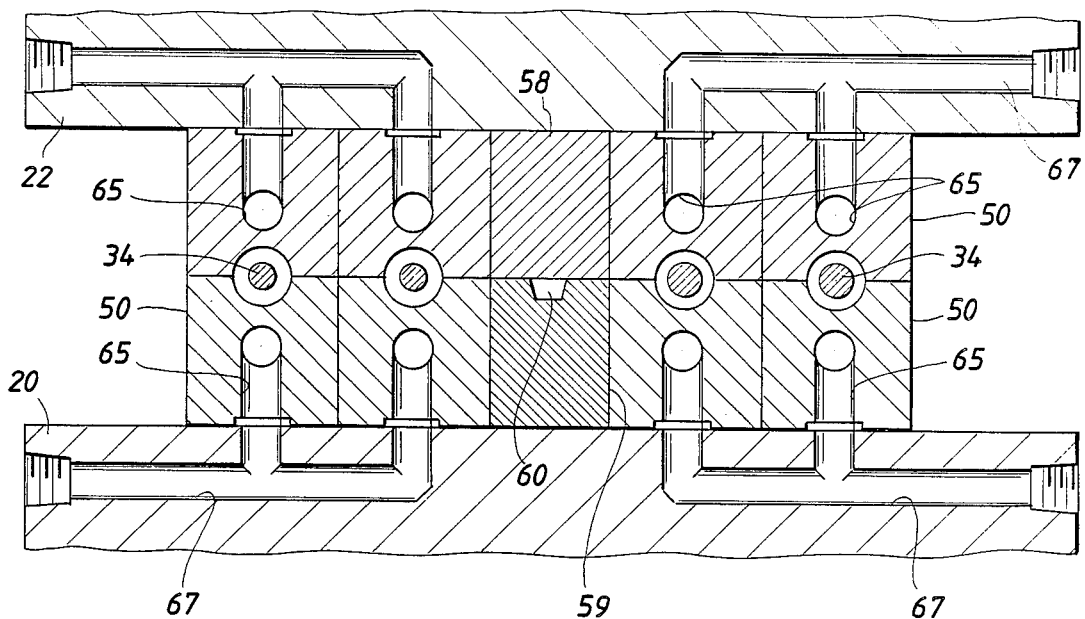

As shown in FIGS. 2 and 7, a tongue 59A on the end of body 59 fits closely within a groove in the face of support 37 of mold member M-2, and the end of the groove 60 formed therein connects with lateral branches 61. The branches 61 in turn connect with lateral grooves 62 in one of the supports (FIG. 7), and these grooves connect with longitudinal grooves 63 whose ends connect with T-shaped grooves 64 in the faces of the gates 52 (FIG. 8). The grooves 64 connect with the extensions of annular spaces on the inner sides of each gate to the left of the restriction R. As shown in FIG. 7, the grooves 62 include portions formed in the recesses in which the ejection sleeves are received.

Cooling and thus hardening of the molded plastic bodies is accelerated by coolant which is circulated through passageways 65 formed longitudinally within the elongate bodies of the mold member blocks. These passageways have threaded ends 66, as shown in FIG. 1, to connect with suitable external coolant conduits, and have laterally extending branches near their opposite ends which connect with passageways 67 within the housing and ejector.

FIG. 14 shows the molded plastic bodies forming the drum sticks as they are removed as a unit from the core pins. These bodies includes elongate portions 70 extending from their tips 71 at their right-hand ends to short annular short sections 72 at their left-hand ends adjacent grooves 73 formed by the restriction R through which the plastic flows toward the ends of the annular space in which the tips 71 are formed. These short sections 72 are in turn connected to one another by sections of molded plastic formed in the passageways and to a pin section 74 which extends to the breakoff point previously described. Upon removal from the mold apparatus, the sections 70 of the plastic bodies which form the finished drumsticks are separated from one another and the short section 72 by merely bending the sections 70 and 72 relative to one another to cause them to break at the grooves 63, thus providing this additional advantage.

Upon removal of the molded bodies within the mold members, the piston may be moved to the left to withdraw the piston rod and thus return the ejector sleeves 39 to their original positions, at which time the mold members may have their inner faces moved back into engagement with one another to again form annular spaces in which additional bodies may be formed.

Any suitable thermoplastic material may be used as long as it is suitable for injection molding and has the required strength for use as a drum stick. For example, a fiberglass reinforced nylon may be used.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for use in forming hollow plastic drumsticks, comprising
   mold members having inner faces with elongate cavities thereon and means for mounting the mold members on the platens of an injection molding press for lateral movement of the mold members with the platens toward and away from one another between inner positions in which their faces are engaged with one another and each of their cavities forms a longitudinally split half of an elongate outer mold surface conforming to the outside of a drumstick and an outer position in which their faces are spaced apart,
   a core pin,
   means for supporting the core pin for extension transversely of the direction of movement of the mold members and concentrically within the outer mold surface to form an annular space between the pin and outer mold surface,
   means on the mold members forming an annular restriction about one end of the annular space,
   means for injecting plastic through said restriction and into the annular space so that plastic flows therethrough in a direction toward the other end thereof to fill same,
   means surrounding the core pin and movable longitudinally therealong for ejecting a molded plastic body from the core pin when the mold members are in their outer positions, and
   means for longitudinally moving the ejecting means.

2. Apparatus defined in claim 1, including
   means for holding one end of the core pin against longitudinal movement with respect to the mold members, and
   means on the inner faces of the mold members for closely receiving the other end of the pin at the other end of said annular space, and wherein
   the ejecting means is movable in a direction away from the holding means to eject the molded body from the other end of the core pin.

3. Apparatus defined in claim 2, wherein
   said pin holding means is movable laterally with respect to the mold members between a first position in which the pin is supported concentrically within the outer mold surfaces, and a second position in which said ejecting means may move longitudinally between the inner faces of said mold members when the mold members are in their outer positions.

4. Apparatus defined in claim 3, wherein
said means for holding one end of the pin is disposed between the mold member faces and supported for guided movement laterally with respect thereto, and
said ejecting means is supported from the pin holding means for guided movement longitudinally with respect thereto.

5. Apparatus defined in claim 4, wherein
the means for moving the ejecting means includes
a cylinder mounted on the pin holding means, and
a piston reciprocable within the cylinder and connected to the ejecting means.

6. Apparatus defined in claim 5, wherein
the ejecting means is supported from the pin holding means by elongate pins which are guidably slidable within the pin holding means and having their opposite ends connected to the ejecting means and guidably slidable along the cylinder.

7. Apparatus defined in claim 1, wherein
said mold members have a plurality of cavities in their inner faces to form a corresponding number of outer mold surfaces when engaged with one another,
there are a corresponding number of core pins each supported in a longitudinally stationary position concentrically within an outer mold surface,
plastic is injected into each annular space, and
each of said core pins is surrounded by ejecting means for movement longitudinally therealong to eject a molded plastic body therefrom.

8. Apparatus defined in claim 7,
each mold member includes a plurality of side-by-side, elongate blocks, and
each block of each mold member has a cavity therein adapted to form an outer mold surface with the cavity of a block of the other mold member.

9. Apparatus defined in claim 8, wherein
each block includes an elongate body in which a cavity is formed, and a separate gate carried at one end of each body,
the gates having inner annular edges on their sides adjacent the elongate bodies which form the restriction in said cavity and cavities forming an extension of the outer mold surface in each block on one side of their annular edges into which plastic may be ejected.

10. Apparatus defined in claim 9, wherein
the ejecting means includes a sleeve surrounding each pin and closing the outer end of the extension of the outer mold surface, and
each mold member includes means supporting the gates and having recesses therein to closely surround the sleeves.

11. Apparatus defined in claim 10, wherein
the supporting means and gates have interconnecting plastic passageways leading to the extensions of outer mold surfaces.

12. Apparatus defined in claim 11, wherein
the gates of the blocks of each mold member have passageways which connect with one another so that plastic may be injected simultaneously into all annular spaces.

13. Apparatus defined in claim 7, wherein
said core pin supporting means comprises means for holding one end thereof against longitudinal movement with respect to the mold members, and
means on the inner faces of the mold members for closely receiving the other end of the pin at the other end of said annular space, and
the ejecting means is movable in a direction away from the holding means to eject the molded body from the other end of the core pin.

14. Apparatus defined in claim 13, wherein
said pin holding means is movable laterally with respect to the mold members between a first position in which the pin is supported concentrically within the outer mold surfaces, and a second position in which said ejecting means may move longitudinally between the inner faces of said mold members when they are in their outer positions.

15. Apparatus defined in claim 14, wherein
said means for holding one end of each pin is disposed between the mold member faces and supported for guided movement laterally with respect thereto, and
said means for ejecting each molded plastic body is supported from the pin holding means for guided movement longitudinally with respect thereto.

* * * * *